Aug. 18, 1942.  B. H. JOHNSTON  2,293,143
FLOW REGULATOR
Filed Oct. 16, 1941  2 Sheets-Sheet 1

B. H. Johnston
INVENTOR.
BY Knowles

Aug. 18, 1942.  B. H. JOHNSTON  2,293,143
FLOW REGULATOR
Filed Oct. 16, 1941   2 Sheets-Sheet 2

B. H. Johnston
INVENTOR.
BY

Patented Aug. 18, 1942

2,293,143

UNITED STATES PATENT OFFICE 2,293,143

FLOW REGULATOR

Burrell Harry Johnston, Tunica, Miss.

Application October 16, 1941, Serial No. 415,315

2 Claims. (Cl. 138—42)

This invention aims to provide a simple but effective mechanism for governing hydraulic pressure supplied to a press, the device embodying novel features whereby the regulator proper may be made self-cleaning.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
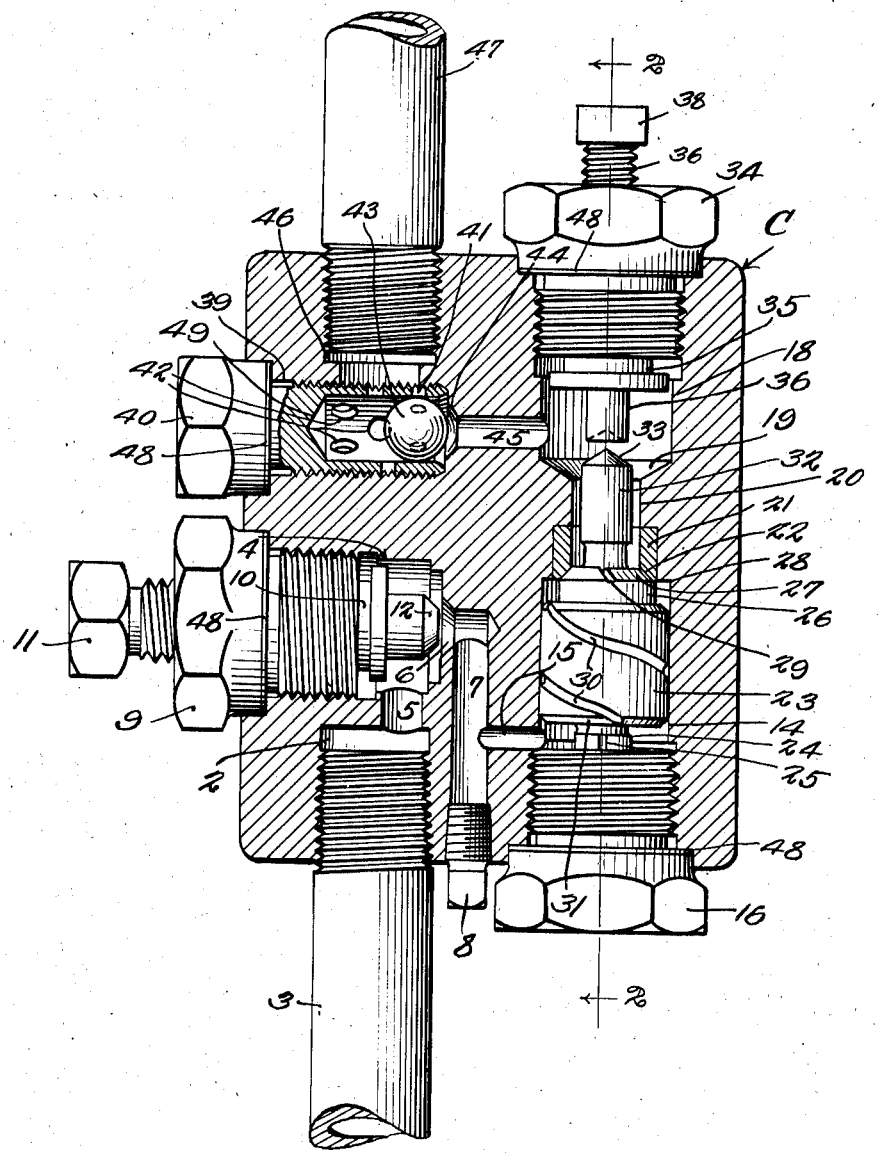
Fig. 1 shows, in vertical section, a device constructed in accordance with the invention.
Figures 2, 3:
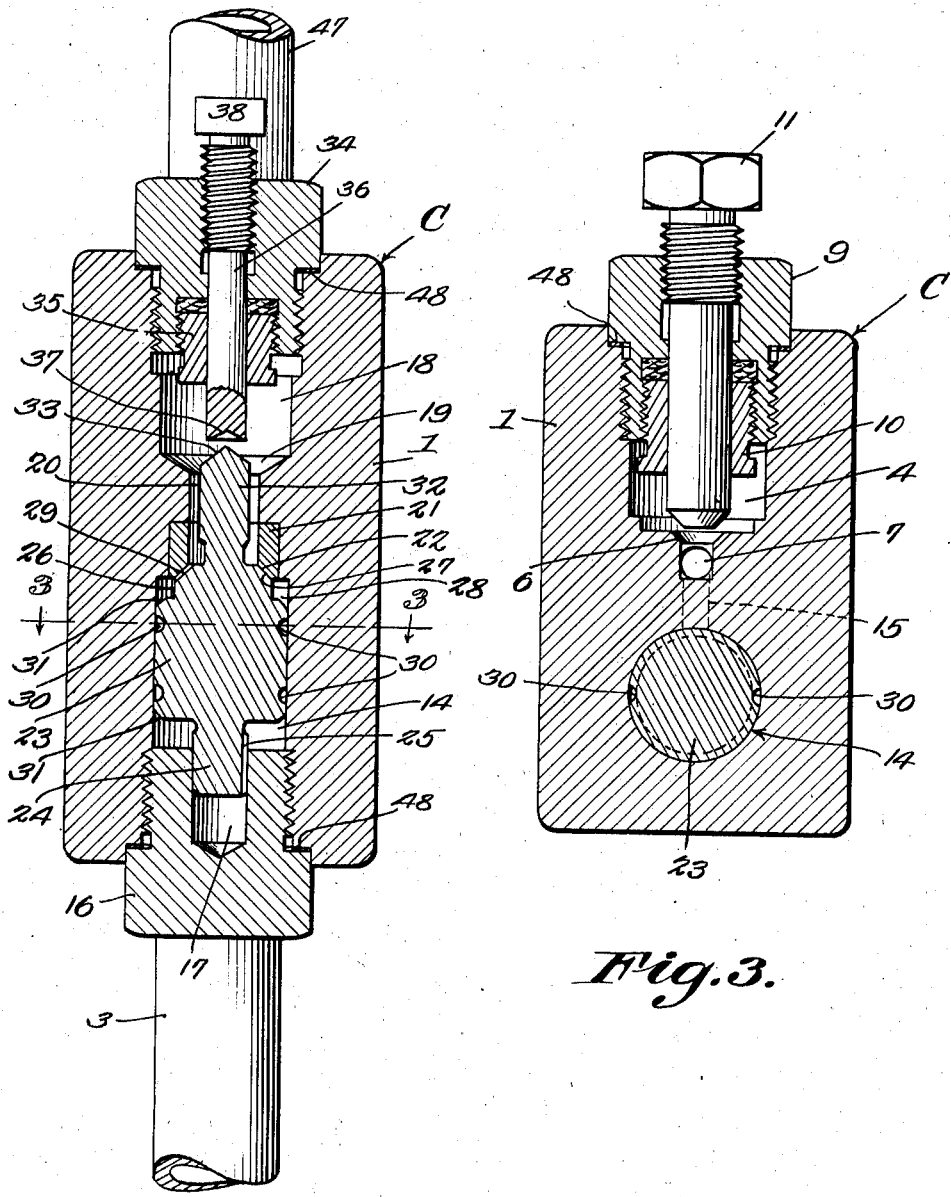
Fig. 2 is a vertical section on the line 2—2 of Fig. 1.
Fig. 3 is a horizontal section on the line 3—3 of Fig. 2.

In carrying out the invention, there is provided a casing C, including a block-like body 1, having a recess 2 at its lower end, into which is threaded an inlet pipe 3. On one side, the body 1 has a transverse recess 4, communication being established between the recesses, by means of a port 5. A valve seat 6 is formed at the inner end of the recess 4 and is in communication with a vertical bore 7, closed at its lower end by a threaded plug 8.

A valve carrier 9 is threaded to a seat in the transverse recess 4, and is supplied at its inner end with a compression gland 10. A cutoff valve 11 is threaded into the valve carrier 9, the gland 10 preventing leakage about the cutoff valve. The cutoff valve 11 has a tapered end 12, adapted to cooperate with the seat 6. The cutoff valve 11 may be closed in the event of emergency or trouble, but normally it stands open, as shown in the drawings.

The body 1 is provided with a longitudinal chamber 14, of circular cross section, the bore 7 being in communication with the lower part of the chamber by way of a port 15. A guide 16 is threaded into the lower end of the chamber 14 and terminates practically flush with the lowermost part of the port 15. The guide 16 has an axial bore 17, which is of circular cross section.

An upper recess 18 is formed in the body 1, in line with the chamber 14, the lower end of the recess being flared, as shown at 19, to permit the ready entrance of hydraulic fluid into the recess. At the lower end of the flared part 19 of the recess 18 there is a passage 20, which is enlarged at its lower end to receive an annular valve seat 21, the valve seat having a flared mouth 22 at its lower end.

A pressure reducer is provided, and includes a body 23 of circular cross section, shaped to fit closely in the chamber 14. At its lower end, the body 23 of the pressure reducer is supplied with a reduced stem 24, received slidably in the bore 17 of the guide 16. The stem 24 has a superficial, shallow groove 25, which permits fluid to pass in and out of the bore 17, when the pressure reducer is reciprocated. Although considerable has been said about the reciprocation of the pressure reducer, it is not a reciprocating structure, in the ordinary operation of the device. The pressure reducer is forced downwardly only for cleaning purposes, and through the instrumentality of a mechanism to be described hereinafter.

The body 23 of the pressure regulator or reducer is equipped at its upper end with a reduced neck 26, having a conical upper part 27, adapted to fit closely in the tapered mouth 22 of the valve seat 21. When the part 27 of the body 23 of the pressure regulator engages the mouth 22 of the valve seat 21, there is a space 28 between the upper end of the body 23 of the regulator and the upper end of the chamber 24. In order that the actuating liquid can pass from the space 28, through the valve seat 21 and through the passage 20, a small, laterally inclined groove 29 is formed in the conical upper part 27 of the regulator body 23. The body 23 has a plurality of spiral grooves 30 in its outer surface, and the body is tapered at both ends, as shown at 31, so that the actuating liquid may readily enter the lower ends of the grooves, from the lower part of the chamber 14, and emerge from the grooves, at their upper ends, into the space shown at 28. The body 23 of the pressure regulator has an upwardly projecting stem 32, which is tapered at its upper end, as shown at 33. The stem 32 is of less diameter than the passage 20.

A guide plug 34 is threaded to a seat in the upper end of the recess 18. In its lower end, the guide plug 34 carries a compression gland 35. An opener 36 for the pressure regulator (of which the body 23 forms part) is provided, and is threaded into the guide plug 34. The gland 35 prevents leakage about the opener 36. The opener 36 extends downwardly into the recess 18 and is provided at its lower end with a conical depression 37, adapted to receive the tapered upper end 33 of the stem 32 of the pressure regulator. The opener 36 is provided at its upper end with a turning head 38.

The part 1 of the casing C is supplied with a transverse bore 39, into which is threaded a valve cage 40. The valve cage 40 has a tubular inner end, in which are formed transverse openings, the openings adjacent to the inner end of the cage being marked by the numeral 41, and the remaining openings being marked by the numeral 42. A ball valve 43 is mounted to move in the tubular portion of the valve cage 40 and is adapted to cooperate wtih a seat 44, connected by a port 45 with the lower portion of the recess 18.

In its upper end, the part 1 of the casing C has a bore 46, and the openings 41 and 42 of the tubular part of the valve cage 40 discharge into the bore 46. An outlet pipe 47 is threaded into the upper part of the bore 46. The numeral 48 designates metallic packings, which can be used wherever necessary.

The device forming the subject matter of this application is adapted to be used in connection with a press of the kind employed in the manufacture of cottonseed oil, linseed oil, soy bean oil, and the like. The actuating fluid for the press enters by way of the inlet pipe 3 and moves through the port 5, the cutoff valve 11 being open. The actuating liquid moves through the seat 6 into the bore 7, the liquid passing into the lower part of the chamber 14, by way of the port 15. The pressure underneath the body 23 of the regulator holds up the regulator, so that the conical upper part 27 of the neck 26 of the regulator is hermetically engaged with the mouth 22 of the valve seat 21. Even though the lower end of the opener 36 is spaced from the upper end 33 of the stem 32 of the regulator, the body 23 of the regulator does not rotate, owing to the friction between the part 27 of the regulator and the corresponding part 22 of the seat 21.

The actuating liquid moves through the grooves 30 of the body 23 of the regulator, but, as hereinbefore stated, and for the reason set forth, the regulator does not rotate. The actuating liquid passes into the space shown at 28 and flows through the groove 29 in the part 27 of the regulator neck 26.

The actuating liquid traverses the passage 20 and flows readily into the recess 18, especially in view of the fact that the lower portion of the recess is flared, as shown at 19. The liquid moves through the bore 45, through the openings 41 of the tubular inner end of the cage 40 and finds an exit to the press (not shown) through the outlet pipe 47.

The ball valve 43 is moved to the left in Fig. 1 until the openings 41 are made available for the passage of pressure, and when those openings are uncovered, there is relief enough between the port 45 and the pipe 47 so that the ball valve does not move to the left beyond the approximate position shown. In the event of back pressure in the pipe 47, the actuating liquid enters the tubular end of the cage 40, by way of the openings 42, and the ball valve 43 closes against the seat 44. Although there is no spring behind the ball valve 43, it does not move inwardly and come into abutment with the cage 40 at the place indicated by the numeral 49 in Fig. 1.

Occasionally it is necessary to clean out the spiral grooves 30 of the regulator body 23. When that is necessary, the regulator is moved downwardly a little, by means of the opener 36, but not enough to close the port 15, and there is always a good pressure of liquid underneath the body 23 of the regulator. When the regulator is moved downwardly, the part 27 of the regulator is spaced from the mouth 22 of the valve seat 21 and there is a ready flow of liquid upwardly, the groove 29 of the regulator no longer being the only element through which the liquid can pass. The liquid, having a comparatively free exit at the upper end of the neck 26 of the regulator, flows rapidly through the spiral grooves 30 of the regulator body 23, the body rotates, and the grooves are cleaned out in a very short time. When the opener 36 is moved upwardly to the position shown in the drawings, the regulator is raised into the abutting engagement with the seat 21, as depicted. This raising of the regulator is brought about by the pressure underneath it.

The pipe 3, the recess 2, the port 5, the bore 7 and the port 15 constitute an inlet conduit. The passage 20, the recess 18, port 45, the bore 46 and the pipe 47 constitute an outlet conduit.

Having thus described the invention, what is claimed is:

1. In a device for governing hydraulic pressure, a casing having an inlet conduit, an outlet conduit, and a chamber of circular cross section disposed between the inlet and the outlet, a seat surface in the casing at one end of the chamber, a regulator mounted to rotate and to move longitudinally in the chamber, between the inlet conduit and the seat surface and having a surface engageable with the seat surface, the inlet conduit supplying pressure against the regulator, to move it into engagement with the seat surface and to hold it against movement, means for maintaining a reduced flow from the inlet conduit to the outlet conduit, past the regulator and through the seat, said means comprising a superficial, spiral groove in the regulator and closed laterally by the wall of the chamber and a groove in one of said surfaces, and means under the control of an operator for moving the regulator, to space it from the seat, thereby promoting the flow through the spiral groove and causing the regulator to rotate.

2. In a device for governing hydraulic pressure, a casing having an inlet conduit, an outlet conduit, and a chamber of circular cross section disposed between the inlet and the outlet, a seat in the casing at one end of the chamber, a regulator comprising a body having a reduced neck, the body being mounted to rotate and to move longitudinally in the chamber, between the inlet conduit and the seat, the inlet conduit supplying pressure against the body of the regulator, to move it until one end of the neck comes into engagement with the seat and to hold the regulator against movement, the said end of the neck having a groove, which is open when said end of the neck engages the seat, means for maintaining a reduced flow from the inlet conduit to the outlet conduit, past the regulator and through the seat, said means comprising the aforesaid groove and a superficial, spiral groove in the regulator and closed laterally by the wall of the chamber, and means under the control of an operator for depressing the regulator, to space the upper portion of the neck from the seat, thereby promoting the flow through the spiral groove and causing the regulator to rotate.

BURRELL HARRY JOHNSTON.